L. L. GOLLER.
DRAFT APPLIANCE.
APPLICATION FILED MAY 28, 1914.
1,143,535.
Patented June 15, 1915.
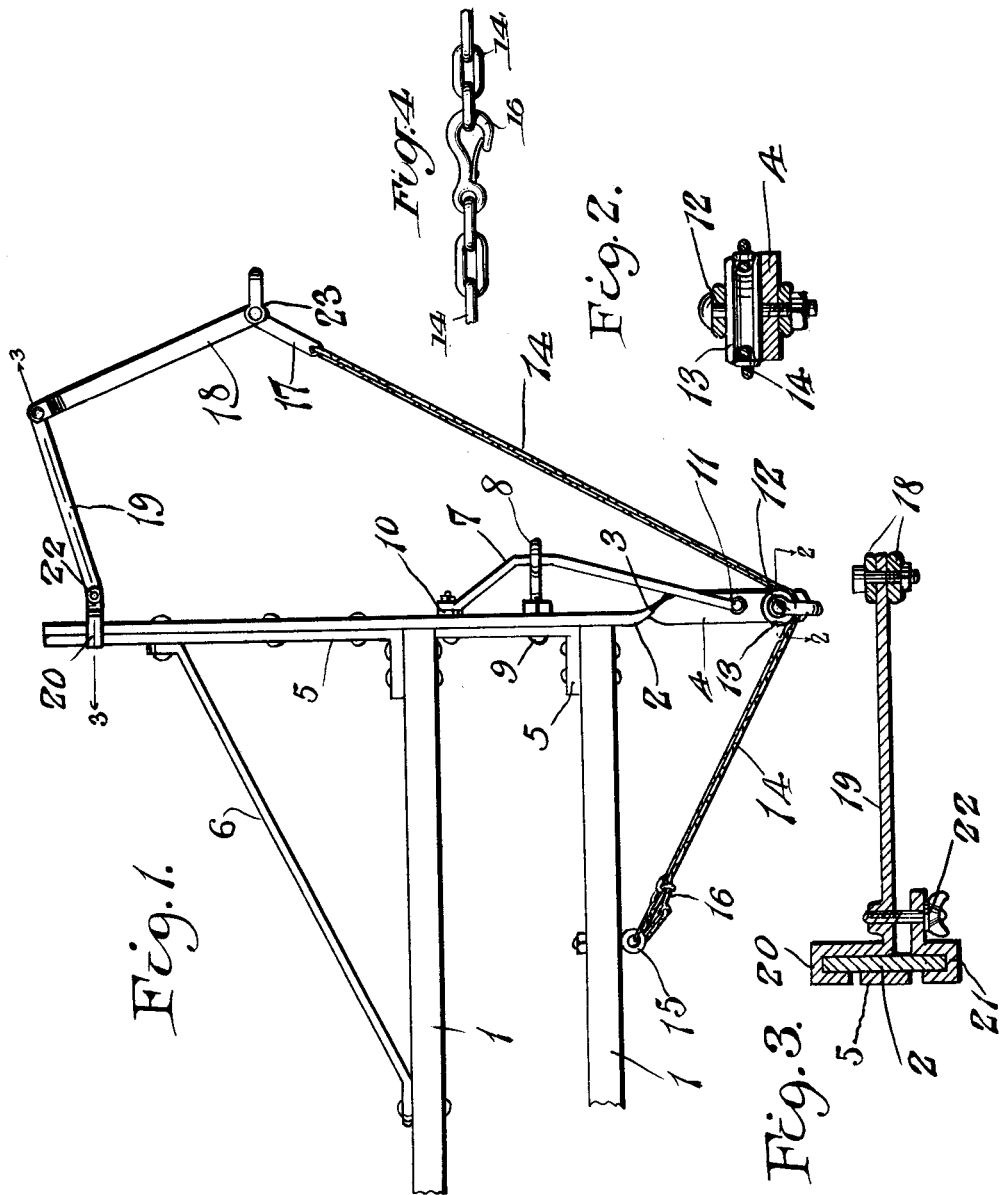
Witnesses:
Inventor.
L. L. Goller.
By
Attorney

UNITED STATES PATENT OFFICE.

LLOYD LESTER GOLLER, OF HANSTON, KANSAS.

DRAFT APPLIANCE.

1,143,535.  Specification of Letters Patent.  Patented June 15, 1915.

Application filed May 28, 1914. Serial No. 841,493.

*To all whom it may concern:*

Be it known that I, LLOYD LESTER GOLLER, a citizen of the United States, residing at Hanston, in the county of Hodgeman and State of Kansas, have invented certain new and useful Improvements in Draft Appliances, of which the following is a specification.

This invention comprehends certain new and useful improvements in draft appliances and has for its primary object to provide means by which the line of draft may be readily changed and the strain upon the different draft animals equalized to overcome side draft.

This invention has for a further object to provide a draft appliance of this character which will be of simple construction and operation and which may be readily secured to gang plows and the like and will be highly efficient in use.

The invention has for a further object to provide a draft appliance of this character which will be constructed in such manner that the various parts thereof may be readily adjusted and secured in adjusted position to regulate the strain and avoid side draft.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1 is a plan view of the complete device, Fig. 2 is a detail sectional view on the plane of line 2—2 of Fig. 1, Fig. 3 is a detail sectional view on the plane of line 3—3 of Fig. 1, and Fig. 4 is a fragmentary detail elevation, showing the snap hook for adjusting the length of the draft chain.

Referring in detail to the drawings by numerals, 1 designates a pair of plow beams, to the forward ends of which is secured the draft bar 2 formed of metal or other suitable material and extended for some distance through the guide of the plow beams 1. The draft bar 2 is given a one-fourth turn to the right side of the plow to place this end 4 in horizontal position, the turned portion of the draw bar being designated by the numeral 3. The draw bar 2 is braced by suitable angular brace members 5 secured to the same and to the sides of the plow beams 1, adjacent the forward ends thereof. A long brace bar 6 is also employed for bracing the draft bar 2 and one end of this brace bar 6 is secured to the beam 1 to the left side of the plow, and the brace bar 6 is extended at an angle to said beam with its forward end secured to the draft bar 2 adjacent the free end projecting from the left side of the plow, as will be readily understood by referring to the drawings.

In order to properly brace the extended end 4 of the draft bar 2, I have provided a clutch bar 7 engaged through the eye 8 and the suitable eye bolts 9 projecting forwardly through the draft bar 2 between the plow beams 1, one end of said truss bar 7 being secured to the main or central portion of the draft bar 2, as shown at 10, while the opposite ends of said truss bar 7 are secured to the horizontal end 4 of said draft bar 2. It will be readily seen that this truss bar will prevent the extended horizontal end 4 of the draft bar 2 from being bent by the strain placed upon the same.

Secured upon the free extremity of the horizontal end 4 of the draft bar 2, is a suitable clevis 12, within which is mounted a guide pulley 13, over which is engaged a draft chain 14 having one end extended through an eye 15 projecting from the plow beam 1. A snap hook 16 is secured upon this end of the chain 14 for engagement in the proper link thereof for the purpose of regulating the length of said chain, and the opposite end of the chain is secured to the stub link 17 which is pivoted to the long link 18 carried by and having pivotal connection with the forwardly projecting arm 19 adjustably mounted upon the left side end of the draft bar 2. The inner end of the arm 19 is bent to form the jaw 20 for engagement over one longitudinal edge of the draft bar 2, while a removable jaw 21 is engaged over the opposite longitudinal edge of said draft bar 2 and connected with the arm 20 by a clamp bolt 22, whereby said arm 20 may be readily secured in adjusted position upon the draft bar 2 by tightening the clamp bolt 22. It will be understood that the arm 19 is always extended at right angles to the draft bar 2 and may be readily adjusted longitudinally of the same by loosening the clamp bolt 22 and moving the jaws 20 and 21 longitudinally of said draft bar 2, after which said clamp bolt 22 may be tightened to secure the arm 20 in adjusted position. It will be understood that the short and long links 17 and 18 are connected by a clevis 23 to which may be connected a doubletree in any suitable manner, and which may carry five or any other suitable or desired number of swingletrees, not shown. The strain upon the draft animals is regulated, as will be understood, by adjustment of the arm 19 longitudinally of the draft bar 2 and by adjusting the links of the draft chain 14 and by properly adjusting these removable parts of the device, side draft may be avoided, thereby increasing the efficiency of the plow or other agricultural implement to which my invention is applied.

From the foregoing it will be readily apparent that I have provided an improved draft appliance formed of the minimum number of parts of simple formation and connected in a novel manner and mounted the movable parts upon the stationary parts so that said movable parts may be readily adjusted to avoid side draft and equalize the strain upon the various draft animals. It will also be readily seen that should any of the parts become worn or broken, they may be readily replaced at a small cost.

While I have shown and described the preferred embodiment of my invention, it will be understood that minor changes in the details of construction, combination and arrangement of parts may be made without departing from the spirit and scope of the invention as claimed or sacrificing any of the advantages thereof.

What is claimed is:—

1. A device of the class described comprising the combination with plow beams; of a draft bar connected with said plow beams, means for bracing said draft bar, an arm projecting forwardly from said draft bar, connections between one of said plow beams and said forwardly projecting arm, and a clevis carried by said connections adjacent said arm.

2. A device of the class described comprising the combination with plow beams and a clevis; of a draft bar connected with said plow beams, and means mounted upon said draft bar to form flexible connections between the plow beams and said clevis.

3. A device of the class described comprising the combination with an agricultural implement; of a rigid member projecting forwardly from one corner of said implement, flexible connections between said rigid member and the opposite corner of said implement, and a clevis carried by said flexible connections.

4. A device of the class described comprising the combination of a transverse draft bar, an arm projecting forwardly from said draft bar and adapted for adjustment longitudinally of the latter, a flexible member connected with said implement, said flexible member mounted upon said draft bar, connections between said flexible member and said arm, and a clevis carried by said connections.

5. A device of the class described comprising the combination with longitudinal beams; of a draft bar connected with said beams, a flexible member connected with the beams to the right side of the implement, a guide member mounted upon the adjacent end of the draft bar for said flexible member, an arm mounted upon the opposite end of said draft bar and adapted for longitudinal adjustment upon the same, connections between said arm and said flexible member, and a draft bar carrying member mounted upon said connections.

6. A device of the class described comprising a pair of beams, a draft bar connecting the adjacent ends of said beams, the ends of the draft bar extending to the right side of the implement being bent at right angles to the main portion of said draft bar, a guide pulley mounted upon said end of the draft bar, a flexible member connected with the beam to the right side of the implement, and passing over said pulley, an arm projecting from the opposite end of said draft bar, link connections between said arm and said flexible member, and a clevis carried by said link connections.

7. A device of the class described comprising the combination with longitudinal beams; of a transverse draft bar connecting the adjacent ends of said beams, means for bracing said draft bar, an arm projecting from said draft bar and extended at right angles to the latter, means for securing said arm in position upon said draft bar, a flexible member connected with said means and engaged over an opposite portion of said draft bar, link connections between said flexible member and said arm, and a clevis carried by said link connections and arm.

8. A device of the class described comprising the combination with beams; of a draft bar positioned against the adjacent ends of said beams and extending to the left side and the right side of the implement, an arm projecting from the left side of said draft bar and having a clamping jaw engaged over the latter, a second clamping jaw engaged over said draft bar, said jaws being adapted for longitudinal movement upon said draft bar, means for drawing together said clamping jaws to secure the arm in adjusted position, the opposite end of said draft bar being bent at right angles to the main portion of said draft bar, a clevis mounted upon the last mentioned end of said draft bar, a guide pulley mounted in said clevis, a flexible member secured to the beams upon the furrow side of the implement, means for adjusting the length of said flexible member, said flexible member being engaged over said guide pulley, link connections between the free ends of the arm and the flexible member, whereby side draft may be avoided and the line of draft readily adjusted by adjustment of the clamp jaws upon the draft bar and adjustment of the flexible member, and a clevis carried by said link connections.

In testimony whereof I affix my signature in presence of two witnesses.

L. L. GOLLER.

Witnesses:
WILLIAM F. HAUN,
LUTHER WHEELER.

Copies of this patent may be obtained for five cents each, by addressing the "Commissioner of Patents, Washington, D. C."